United States Patent
Rantzau et al.

(10) Patent No.: US 10,637,756 B2
(45) Date of Patent: Apr. 28, 2020

(54) TRAFFIC ANALYTICS SERVICE FOR TELEMETRY ROUTERS AND MONITORING SYSTEMS

(71) Applicant: Cisco Technology, Inc., San Jose, CA (US)

(72) Inventors: Ralf Rantzau, San Jose, CA (US); Xinyuan Huang, San Jose, CA (US); Purushotham Kamath, San Jose, CA (US); Debojyoti Dutta, Santa Clara, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 15/810,552

(22) Filed: Nov. 13, 2017

(65) Prior Publication Data

US 2019/0149440 A1 May 16, 2019

(51) Int. Cl.
*H04L 12/26* (2006.01)
*H04L 29/06* (2006.01)
*H04L 12/24* (2006.01)

(52) U.S. Cl.
CPC .......... *H04L 43/045* (2013.01); *H04L 41/147* (2013.01); *H04L 43/062* (2013.01); *H04L 63/1425* (2013.01); *H04L 41/145* (2013.01); *H04L 43/08* (2013.01)

(58) Field of Classification Search
None
See application file for complete search history.

(56) References Cited

U.S. PATENT DOCUMENTS

| | | | |
|---|---|---|---|
| 7,751,325 B2 | 7/2010 | Krishnamurthy et al. | |
| 7,898,976 B2 | 3/2011 | Duffield et al. | |
| 9,560,078 B2 | 1/2017 | Sood et al. | |
| 2005/0039086 A1* | 2/2005 | Krishnamurthy | H04L 41/142 714/57 |
| 2012/0016633 A1* | 1/2012 | Wittenstein | G06F 21/552 702/180 |
| 2016/0196515 A1* | 7/2016 | Adler | G06Q 10/0635 705/7.28 |
| 2016/0245921 A1* | 8/2016 | Li | G04F 5/14 |
| 2016/0328159 A1* | 11/2016 | Coddington | G06F 13/4282 |
| 2016/0328432 A1* | 11/2016 | Raghunathan | G06F 17/30333 |
| 2016/0371181 A1* | 12/2016 | Garvey | G06F 12/0253 |

(Continued)

OTHER PUBLICATIONS

Joseph Idziorek, "Exploiting cloud utility models for profit and ruin", 2012 (Year: 2012).*

(Continued)

*Primary Examiner* — Kodzovi Acolatse
(74) *Attorney, Agent, or Firm* — Behmke Innovation Group LLC; James M. Behmke; Jonathan P. Western (57) ABSTRACT

In one embodiment, a service converts a stream of network telemetry data into sketches. The stream of network telemetry data comprises a plurality of characteristics of traffic observed in a network. The service forms a time series of the sketches. The service performs anomaly detection on the time series of the sketches in part by calculating a joint distribution of ranks and frequencies of a portion of the characteristics at different points in time of the time series. The service sends an anomaly detection alert, when an anomaly is detected from the time series of the sketches.

17 Claims, 9 Drawing Sheets

(56) References Cited

U.S. PATENT DOCUMENTS

| | | | |
|---|---|---|---|
| 2017/0154107 A1* | 6/2017 | Awad | G06F 17/30705 |
| 2017/0192872 A1* | 7/2017 | Awad | G06F 17/18 |
| 2017/0228660 A1 | 8/2017 | Kutzkov et al. | |
| 2017/0341654 A1* | 11/2017 | Prakah-Asante | B60W 50/14 |
| 2018/0129959 A1* | 5/2018 | Gustafson | G06N 5/022 |
| 2018/0137424 A1* | 5/2018 | Gabaldon Royval | G06N 5/022 |
| 2018/0247073 A1* | 8/2018 | Kreutzer | G06F 21/6227 |
| 2018/0277069 A1* | 9/2018 | Jalgha | G10D 3/14 |

OTHER PUBLICATIONS

Cheung-Mon-Chan, et al., "Finding Hierarchical Heavy Hitters with the Count Min Sketch", Conference Paper, Feb. 2006, 10 pages, Research Gate.

"Count-min sketch", https://en.wikipedia.org/wiki/Count-min_sketch, 2 pages, Jul. 12, 2017, Wikimedia Foundation, Inc.

"Pareto distribution", https://en.wikipedia.org/wiki/Pareto_distribution, Aug. 10, 2017, 7 pages, Wikimedia Foundation, Inc.

"Power law", https://en.wikipedia.org/wiki/Power_law, Sep. 13, 2017, 7 pages, Wikimedia Foundation, Inc.

"Streaming algorithm", https://en.wikipedia.org/wiki/Streaming_algorithm, Sep. 15, 2017, 5 pages, Wikimedia Foundation, Inc.

"Sketch Elements" https://datasketches.github.io/docs/SketchElements.html; DataSketches Sketch Elements; pp. 1-2.

\* cited by examiner

TRAFFIC ANALYTICS SERVICE FOR TELEMETRY ROUTERS AND MONITORING SYSTEMS

TECHNICAL FIELD

The present disclosure relates generally to computer networks, and, more particularly, to a traffic analytics service for telemetry routers and monitoring systems.

BACKGROUND

As computer networks continue to expand, so too will the variety of telemetry data available from monitoring a computer network. Accordingly, the sheer volume of generated telemetry data may be too cumbersome for the system to process as a whole, due to resource constraints. For example, any reporting of telemetry data over the network will naturally reduce the amount of bandwidth that can be used for actual data traffic in the network. Similarly, the amount of storage and processing resources needed to retain and assess the captured telemetry data may be unfeasible in most networks. However, despite the various challenges associated with an ever-growing set of network telemetry data, more opportunities may also arise from an analytics standpoint.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, a service converts a stream of network telemetry data into sketches. The stream of network telemetry data comprises a plurality of characteristics of traffic observed in a network. The service forms a time series of the sketches. The service performs anomaly detection on the time series of the sketches in part by calculating a joint distribution of ranks and frequencies of a portion of the characteristics at different points in time of the time series. The service sends an anomaly detection alert, when an anomaly is detected from the time series of the sketches.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may further be interconnected by an intermediate net81work node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless networks. That is, in addition to one or more sensors, each sensor device (node) in a sensor network may generally be equipped with a radio transceiver or other communication port, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

Figure 1A:
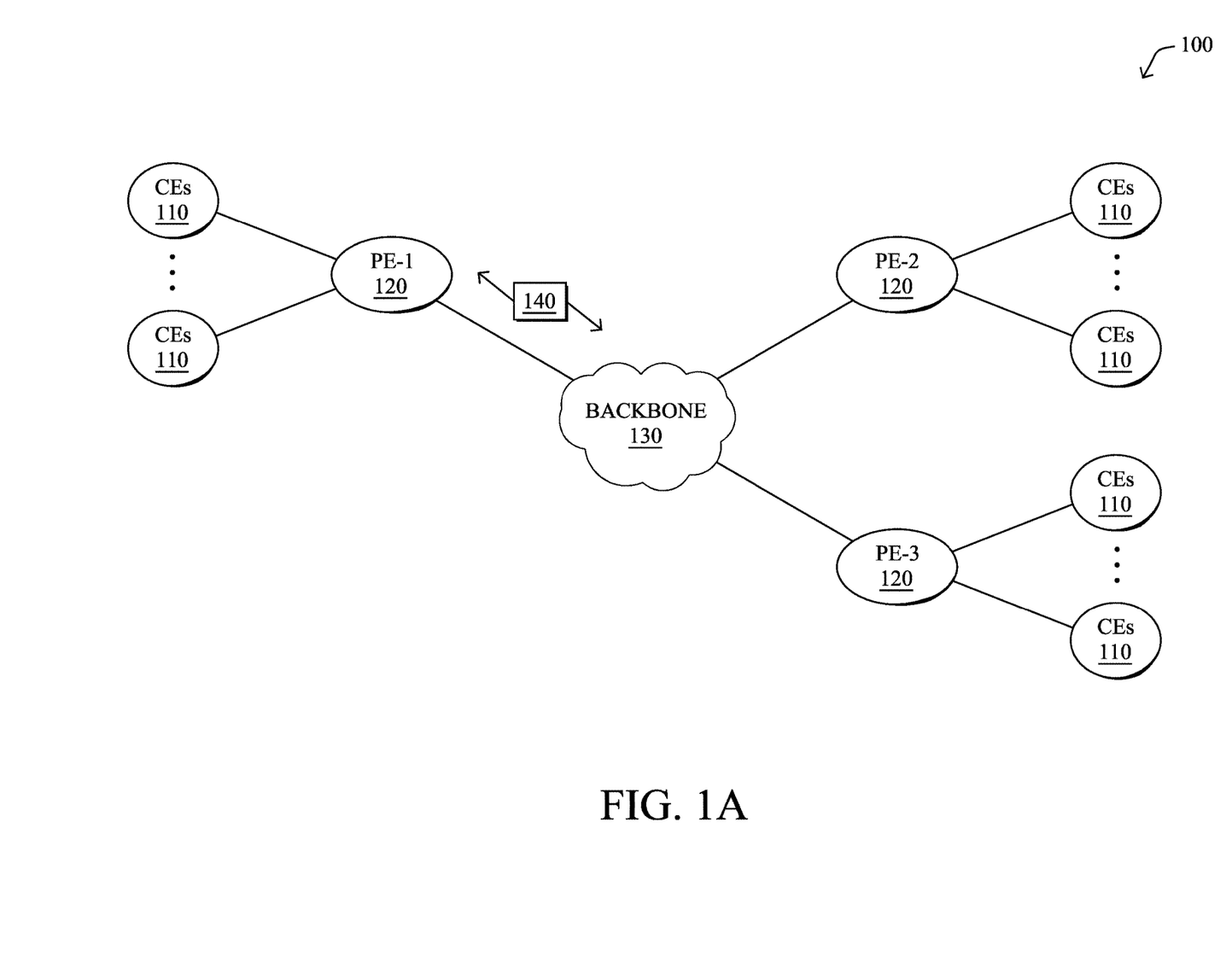
FIGS. 1A-1B illustrate an example communication network.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN, thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/LTE backup connection). For example, a particular CE router 110 shown in network 100 may support a given customer site, potentially also with a backup link, such as a wireless connection.

2.) Site Type B: a site connected to the network using two MPLS VPN links (e.g., from different service providers), with potentially a backup link (e.g., a 3G/4G/LTE connection). A site of type B may itself be of different types:

2a.) Site Type B1: a site connected to the network using two MPLS VPN links (e.g., from different service providers), with potentially a backup link (e.g., a 3G/4G/LTE connection).

2b.) Site Type B2: a site connected to the network using one MPLS VPN link and one link connected to the public Internet, with potentially a backup link (e.g., a 3G/4G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/LTE backup link). For example, a particular customer site may include a first CE router 110 connected to PE-2 and a second CE router 110 connected to PE-3.

Figure 1B:
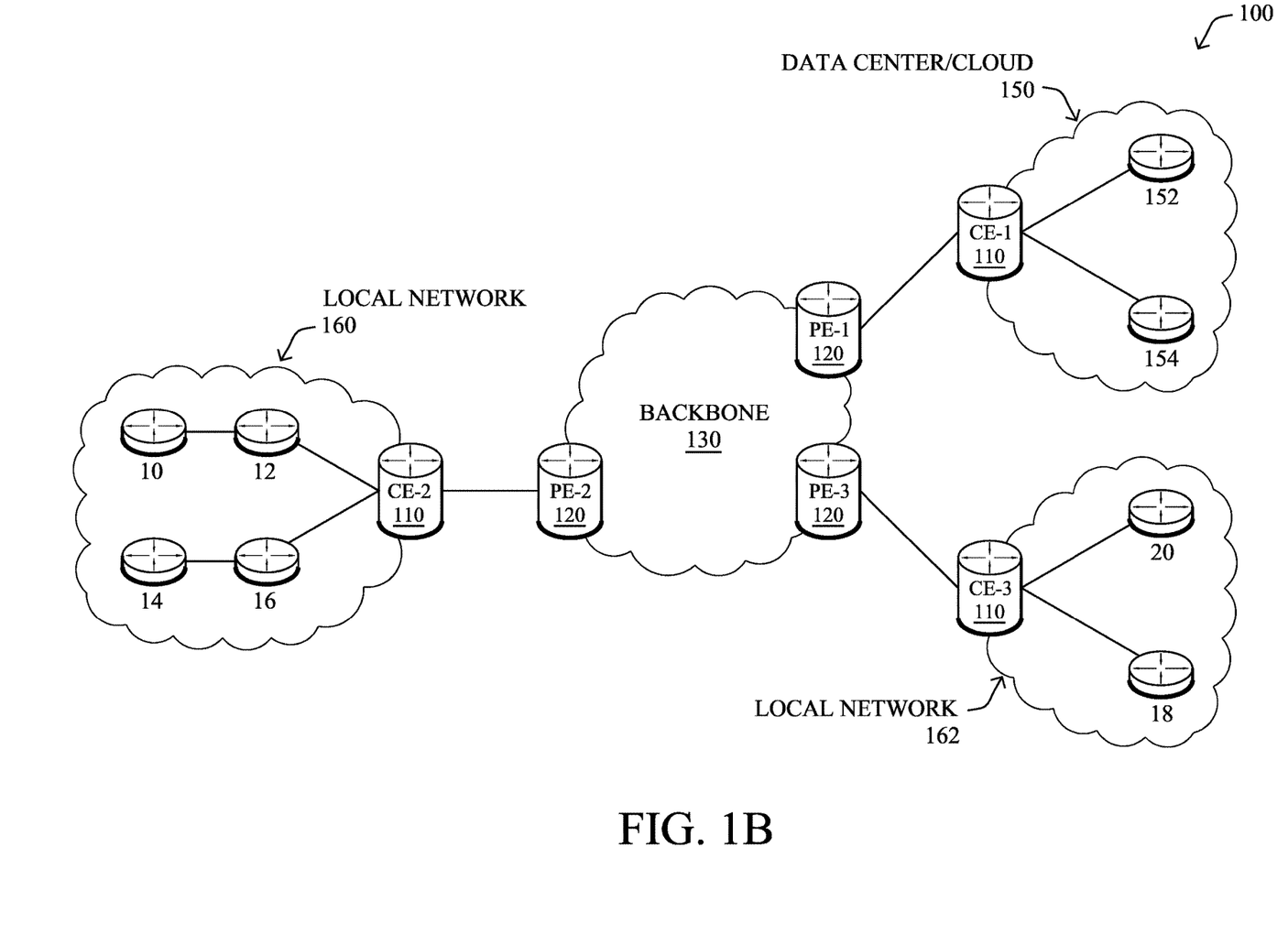

FIG. 1B illustrates an example of network 100 in greater detail, according to various embodiments. As shown, network backbone 130 may provide connectivity between devices located in different geographical areas and/or different types of local networks. For example, network 100 may comprise local networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

The techniques herein may also be applied to other network topologies and configurations. For example, the techniques herein may be applied to peering points with high-speed links, data centers, etc. Further, in various embodiments, network 100 may include one or more mesh networks, such as an Internet of Things network. Loosely, the term "Internet of Things" or "IoT" refers to uniquely identifiable objects/things and their virtual representations in a network-based architecture. In particular, the next frontier in the evolution of the Internet is the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Notably, shared-media mesh networks, such as wireless networks, etc., are often on what is referred to as Low-Power and Lossy Networks (LLNs), which are a class of network in which both the routers and their interconnect are constrained. In particular, LLN routers typically operate with highly constrained resources, e.g., processing power, memory, and/or energy (battery), and their interconnections are characterized by, illustratively, high loss rates, low data rates, and/or instability. LLNs are comprised of anything from a few dozen to thousands or even millions of LLN routers, and support point-to-point traffic (e.g., between devices inside the LLN), point-to-multipoint traffic (e.g., from a central control point such at the root node to a subset of devices inside the LLN), and multipoint-to-point traffic (e.g., from devices inside the LLN towards a central control point). Often, an IoT network is implemented with an LLN-like architecture. For example, as shown, local network 160 may be an LLN in which CE-2 operates as a root node for nodes/devices 10-16 in the local mesh, in some embodiments.

Figure 2:
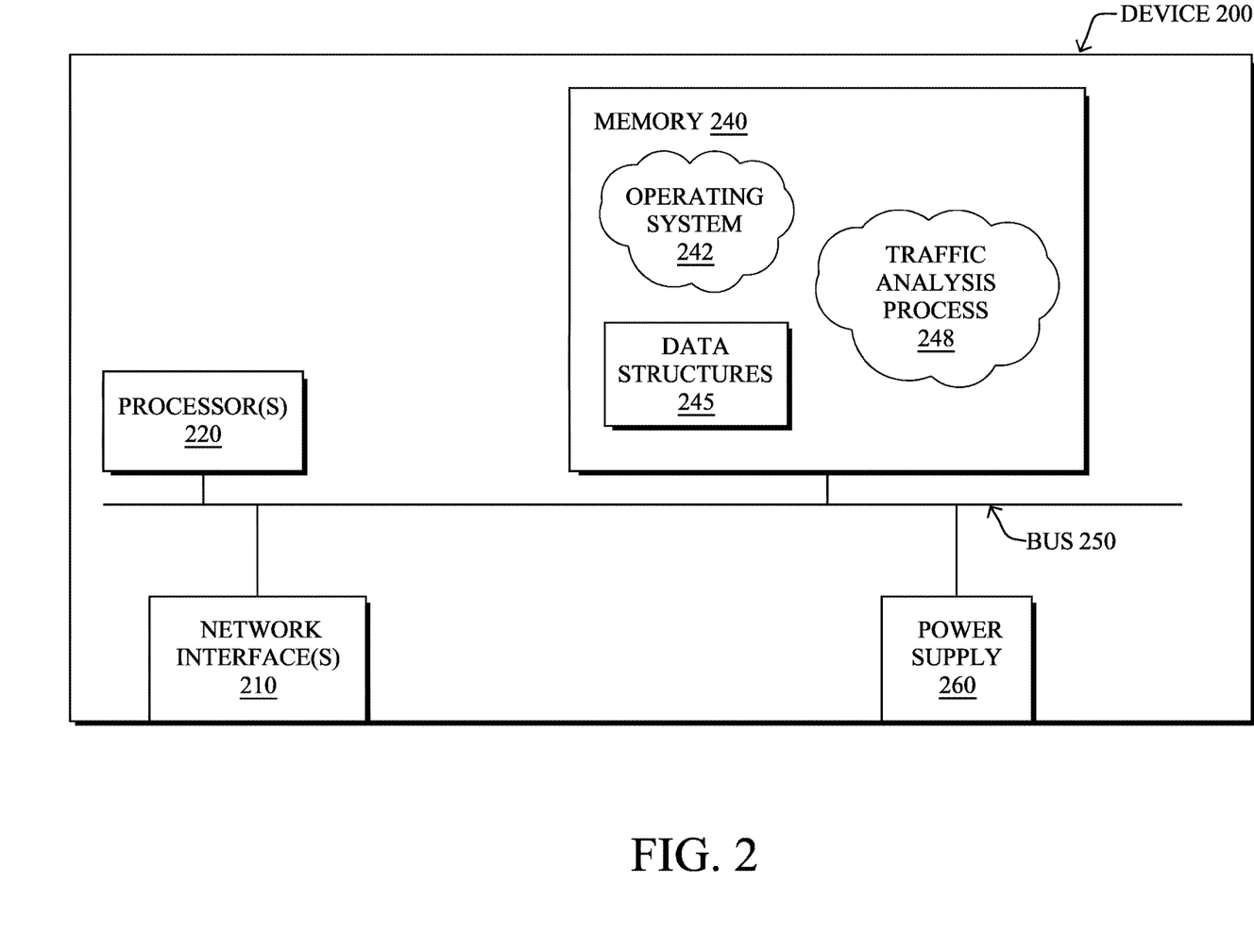
FIG. 2 illustrates an example network device/node.

FIG. 2 is a schematic block diagram of an example node/device 200 that may be used with one or more embodiments described herein, e.g., as any of the computing devices shown in FIGS. 1A-1B, particularly the PE routers 120, CE routers 110, nodes/device 10-20, servers 152-154 (e.g., a network controller located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise a traffic analysis process 248.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

In various embodiments, traffic analysis process 248 may be configured to analyze telemetry data regarding traffic observed in a network. In some cases, traffic analysis process 248 may assess the captured telemetry data on a per-flow basis. In other embodiments, traffic analysis 248 may assess telemetry data for a plurality of traffic flows based on any number of different conditions. For example, traffic flows may be grouped based on their sources, destinations, temporal characteristics (e.g., flows that occur around the same time, etc.), combinations thereof, or based on any other set of flow characteristics.

In general, the telemetry data that traffic analysis process 248 analyzes may comprise any number of characteristics of one or more observed traffic flows in a network. For example, these characteristics may include, but are not limited to, any or all of the following:

- Measurements obtained from the traffic itself—this may include information available from the packet headers of the traffic, such as the source and destination ports or addresses, the protocols in use, etc. If available, information available from the payloads of the packets (e.g., using deep packet inspection), can also be captured.
- Traffic performance metrics—this may include information about the bandwidth usage of the traffic, delays, jitters, packet loss, transmission times, or the like.
- Device metrics—this may include resource or other operational metrics regarding the devices involved in the traffic (e.g., endpoints and/or intermediary devices), such as their resource consumptions, state information, routing information, or the like.
- Derived information—this may include information that can be derived from any of the above metrics, such as statistics, aggregated metrics, inferred information (e.g., an application associated with the traffic, etc.), or the like.
- Log messages—this may include information such as threshold crossing alerts for any of the above, health checks, other assessments, and the like.
- Error codes—this may be, in many cases, a subset of the above log messages, but specifically can include any error messages, such as failure alerts, anomaly alerts, security alerts, performance alerts, and the like.

As would be appreciated, the above characteristics are for illustrative purposes only and any other available measurement related to network traffic can also be included in the set of telemetry data assessed by traffic analysis process 248.

Figure 3:
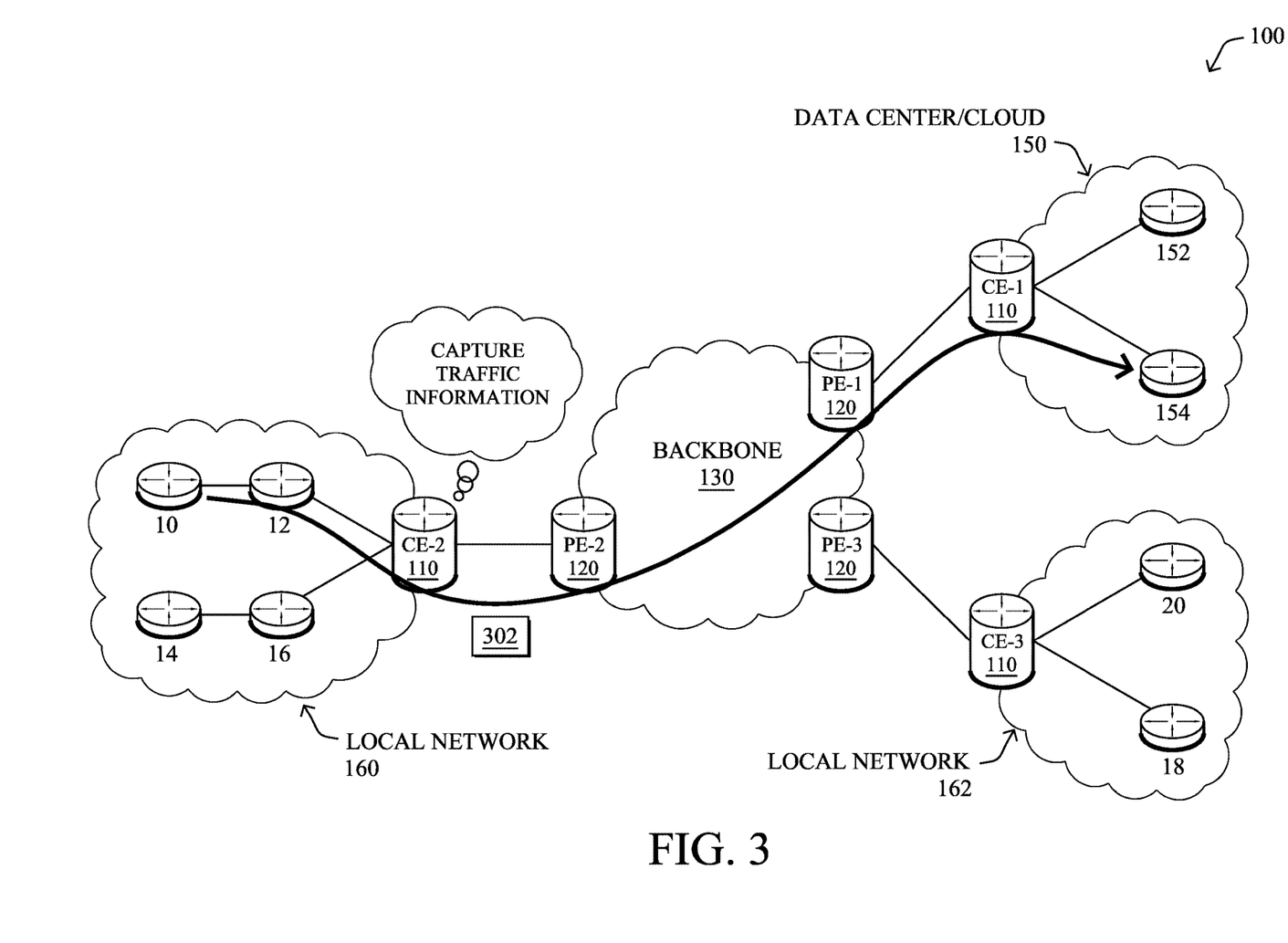
FIG. 3 illustrates an example of a device capturing traffic information.

As shown in FIG. 3, various mechanisms can be leveraged to capture characteristic information about traffic in a network, such as telemetry data regarding a traffic flow. For example, consider the case in which client node 10 initiates a traffic flow with remote server 154 that includes any number of packets 302. Any number of networking devices along the path of the flow may analyze and assess packet 302, to capture telemetry data regarding the traffic flow. For example, as shown, consider the case of edge router CE-2 through which the traffic between node 10 and server 154 flows.

In some embodiments, a networking device may analyze packet headers, to capture feature information about the traffic flow. For example, router CE-2 may capture the source address and/or port of host node 10, the destination address and/or port of server 154, the protocol(s) used by packet 302, or other header information by analyzing the header of a packet 302.

In further embodiments, the device may also assess the payload of the packet to capture information about the traffic flow. For example, router CE-2 or another device may perform deep packet inspection (DPI) on one or more of packets 302, to assess the contents of the packet. Doing so may, for example, yield additional information that can be used to determine the application associated with the traffic flow (e.g., packets 302 were sent by a web browser of node 10, packets 302 were sent by a videoconferencing application, etc.).

Figure 4:
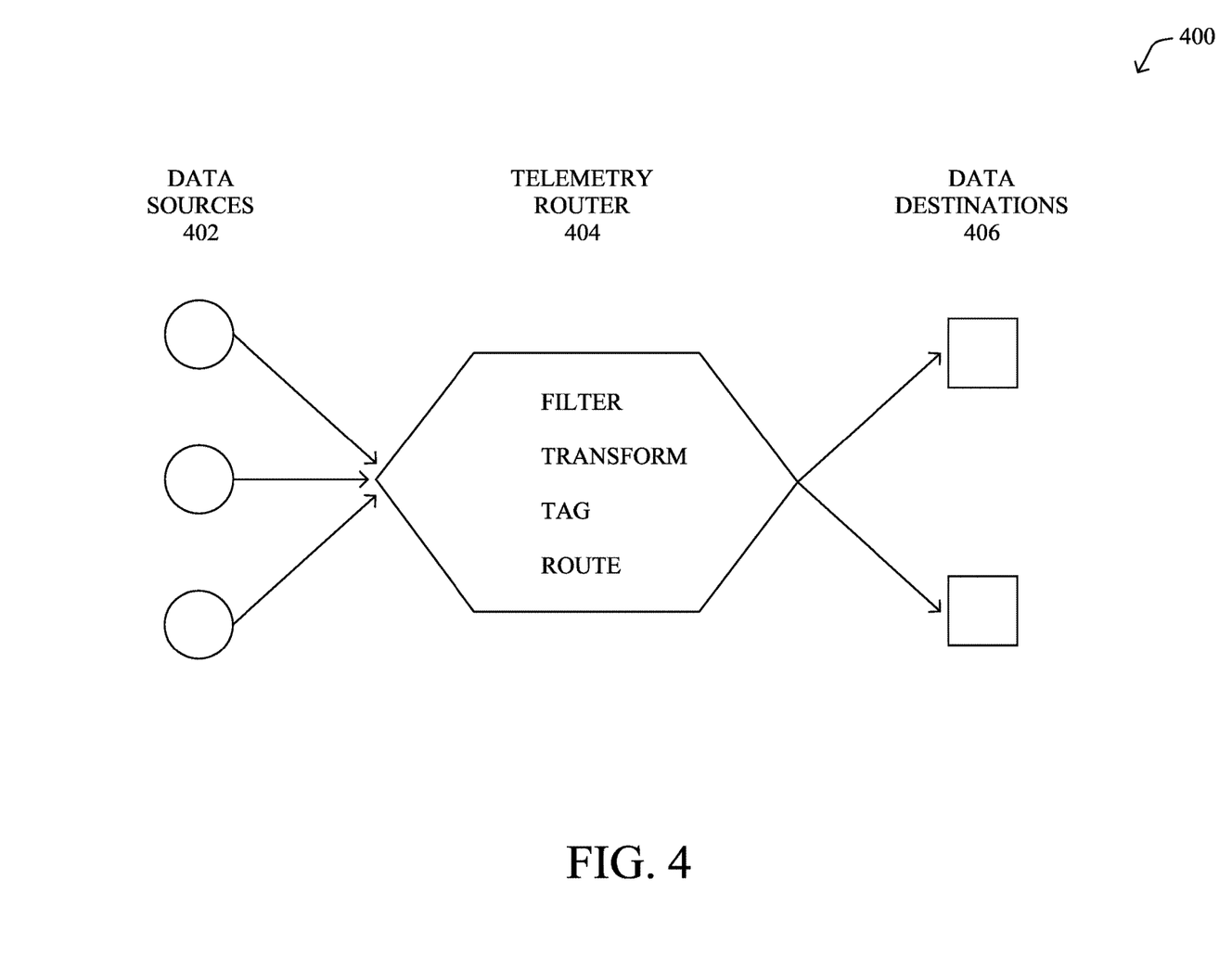
FIG. 4 illustrates an example telemetry router.

FIG. 4 illustrates an example 400 of a telemetry router, according to various embodiments. As shown, there may be any number of data sources 402 distributed throughout a monitored network. In general, a data source 402 may be any network device configured to capture and export telemetry data regarding traffic-related characteristics in the network. For example, CE-2 shown in FIG. 3 may be one such data source that collects telemetry data regarding the traffic that flows through CE-2.

Also as shown, there may be any number of data destinations 404 that consume the telemetry data generated by data sources 402. For example, data destinations 406 may be devices or services that perform analyses on the generated telemetry data (e.g., by executing traffic analysis process 248 or another process). Such data destinations 406 may be located in the same local network as that of data sources 402 or, alternatively, located at a remote location, such as in a data center or as part of a cloud-based service.

In various embodiments, a telemetry router 404 may be located between the data sources 402 and data destinations 406. During operation, telemetry router 404 may perform any or all of the following:

1. receive telemetry data from data sources 402;
2. filter, transform, and/or tag the telemetry data, and
3. send the telemetry data to one or more data destinations 406, such as monitoring systems.

As would be appreciated, while telemetry router 404 is a "router" in the sense that it routes the telemetry data from a data source 402 to a data destination 406, telemetry router 404 is not limited to being a physical network router and may, in further embodiments, be any other device or service configured to relay telemetry data between data sources 402 to one or more data destinations 406.

By implementing one or more telemetry routers 406 in the network, resource consumption by the telemetry data collection mechanism can be reduced. For example, by filtering, transforming, and/or tagging the telemetry data received from data sources 402, telemetry router 404 can effectively reduce the amount of data actually sent to data destinations 406.

As noted above, the amount of telemetry data available from a network continues to grow. With this come new opportunities and challenges, with respect to analyzing the telemetry data. One example of this is analyzing the dynamics of the different characteristics captured in the telemetry data, such as measuring traffic associated with data content. Doing so requires distinguishing between different items/characteristics in the telemetry data, such as to determine the number of occurrences of each item in the telemetry data, which is computationally challenging. Notably, the system does not know a-priori what items to look for in the telemetry data, in order to tally the counters for the items. In addition, there are often too many unique items to track, especially when there is a high-bandwidth stream of telemetry data. However, identification of the following from the stream of telemetry data can be important for purposes of pinpointing issues in the network and taking corrective measures:

Heavy hitters: What items occur most frequently?
Shooting stars: What items rise or fall in frequency the fastest?
Steady growers: What items display a relatively constant increase in frequency?
Late bloomers: What items have been present for a long time and begin rising in frequency quite late?

Traffic Analytics Service for Telemetry Routers and Monitoring Systems

The techniques herein introduce a stochastic, single-pass approach to analyzing a stream of network telemetry data. In some aspects, the techniques herein can be used to populate a time series database of data sketches of the telemetry data, to analyze the dynamic aspects of changes in data item frequency, such as the velocity, acceleration, and/or volatility. In another aspect, new measures of anomalies are introduced herein, that are based on these dynamic changes. In turn, this allows the monitoring and analysis system to send anomaly detection alerts to network administrators and/or other systems in the network, to initiate corrective measures, as necessary.

Specifically, according to one or more embodiments of the disclosure as described in detail below, a service converts a stream of network telemetry data into sketches. The stream of network telemetry data comprises a plurality of characteristics of traffic observed in a network. The service forms a time series of the sketches. The service performs anomaly detection on the time series of the sketches in part by calculating a joint distribution of ranks and frequencies of a portion of the characteristics at different points in time of the time series. The service sends an anomaly detection alert, when an anomaly is detected from the time series of the sketches.

Illustratively, the techniques described herein may be performed by hardware, software, and/or firmware, such as in accordance with the traffic analysis process 248, which may include computer executable instructions executed by the processor 220 (or independent processor of interfaces 210) to perform functions relating to the techniques described herein.

Figure 5:
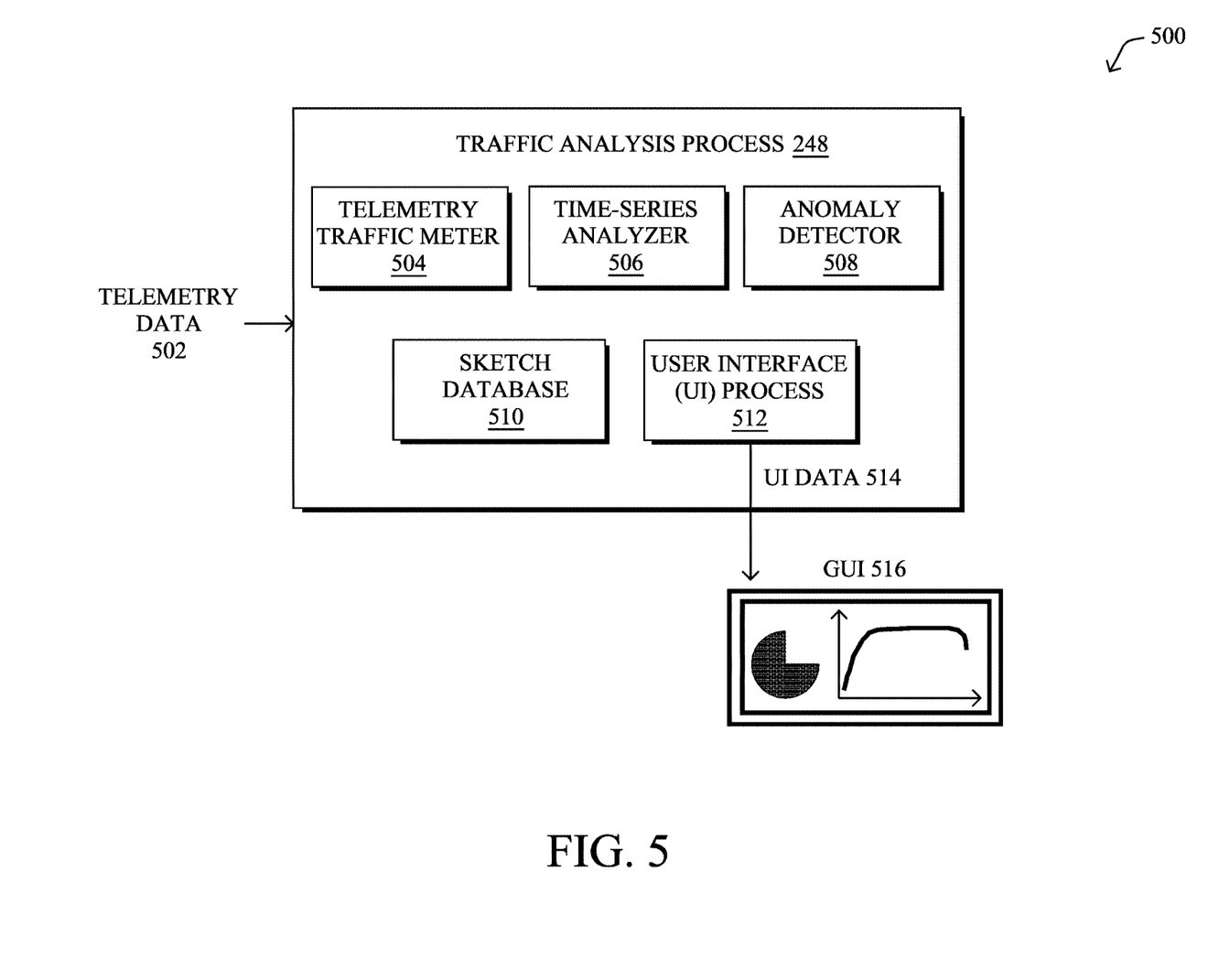
FIG. 5 illustrates an example architecture for analyzing network telemetry data.

Operationally, FIG. 5 illustrates an example architecture 500 for analyzing network telemetry data, according to various embodiments. As shown, traffic analysis process 248 may include any number of sub-processes and/or may access any number of memory locations. As would be appreciated, these sub-processes and/or memory locations may be located on the same device or implemented in a distributed manner across multiple devices, the combination of which may be viewed as a single system/device that executes traffic analysis process 248.

Further, while certain functionalities are described with respect to the sub-processes and memory locations, these functions can be added, removed, or combined as desire, in further implementations. By way of example, architecture 500 may be implemented as a service on a telemetry router, such as telemetry router 404 and/or a data destination 406, as shown in FIG. 4. In other embodiments, architecture 500 can be implemented as a micro-service using REST application programming interfaces (APIs), to be used for other services or flow analytics, APIs for queries, or the like.

In various embodiments, traffic analysis process 248 may include a telemetry traffic meter 504 that receives one or more streams of telemetry data 502. As detailed above, telemetry data 502 may comprise a plurality of characteristics of traffic observed in a network (e.g., log messages, error codes, metrics/key-value pairs, etc.). In turn, telemetry traffic meter 504 may convert the stream of telemetry data 502 into data sketches.

Generally speaking, data sketches refer to a category of single-pass analytic approaches (e.g., each item in the data stream is processed only once) that summarize a data stream using approximations with a predicable error. While a wide variety of sketch types exist, they all generally transform a data stream into a data structure from which estimates are then made. Such a data structure typically comprises a set of hash values that are populated from the transformation stage. In turn, estimates are made from the data structure and used to represent the data stream during processing. Since each element of the incoming data stream is assessed only a single time when sketching, sketch updating is a relatively quick process. In addition, the size of the sketch data structure grows at a much smaller rate than that of the data stream being sketched, typically sub-linearly, thereby greatly reducing the amount of consumed storage resources, as well.

For purposes of illustration of the techniques herein, telemetry traffic meter 504 may utilize count-min sketching, to convert telemetry data 502 into sketches. Count-min sketching operates by capturing frequency information for elements of a data stream using hash functions to map occurrences of a given element to frequencies. However, further embodiments also may use other forms of sketches such as, but not limited to, frequent item sketches, quantile sketches, sampling sketches, tuple sketches, and the like.

In the case of telemetry traffic meter 504 using count-min sketching to convert telemetry data 502 into sketches, pseudocode for its operation may be as follows:

```
Input:
    DataStream; // e.g., stream of telemetry data 502
Repeat:
    I ← next item from DataStream;
    Update_Sketch(S, I); // updates sketch S to adjust the number of
    occurrences of I, such as by incrementing counters in an array
    determined by hash functions //
    if timestamp(I) = T then //has the boundary timestamp of next time
    interval been reached? //
        L ← Top_Items(S, k); //store the top k-number of items in list L
        Store(T, S, L); //store tuple (T, S, L) in time series database
        Prune_Database( ); //optionally, prune old tuples from the
        database that are less relevant (e.g., only keep sketches for every
        minute of current hour, every hour of current day, every hour of
        current month, every month of current year, etc.);
    end if
```

Thus, for any predefined time interval, telemetry traffic meter 504 may generate a corresponding sketch of the items in telemetry data 502 that have timestamps within that interval. In turn, telemetry traffic meter 504 may store the sketches in sketch database 510. As each of the stored sketches is associated with a different time interval, these sketches effectively form a time series of sketches, in their own right.

For a given period of time (t_1, t_2, ..., t_m), the records in database 510 can be mapped to a 3rd-order tensor X, where X[i,j,t] denotes the frequency of the $i^{th}$ item at the top-$j^{th}$ position at time t. If the $i^{th}$ item does not appear among the top-k items at time t, then the frequency is simply set to 0. Note that the size of X is n*k*m, where n is the overall number of unique top-k items that appeared in the time period, n≥k, n<<total number of items. This makes X very space-efficient.

In some embodiments, traffic analysis process 248 may include a time series analyzer 506 that is configured to analyze the time series of sketches generated by telemetry traffic meter 504. In particular, by storing sketches over time in sketch database 510, i.e., a time series of sketches, time series analyzer 506 can compute, by flattening X along the j-axes, any or all of the following:
 F: Frequency—the number of occurrences of an item at a given time.
 D: Difference—the difference/delta (e.g., absolute number of increase/decrease) in item frequencies between any two points in time.
 V: Velocity—the increase or decrease of D over time, V=D' (e.g., the $1^{st}$ derivative of D).
 A: Acceleration—the increase or decrease of V over time, A=V'=D'' (e.g., the $2^{nd}$ derivative of D).

The measures D, V, and A are deviations that show the dynamic aspects of the frequencies. For example, count-min is a sketch that computes the frequency of the more frequent items with greater precision than the rare items. This is the case for data distributions that follow a power law, such as the Pareto distribution. We can compute a good approximation of a Pareto distribution based on a few data points such as the top k-number of items and their frequencies, where k may be selected as desired. It is assumed herein that the typical distribution of telemetry data 502 follows a power law.

As part of the phase where the latest list of top-k items at time $t_i$ is computed from telemetry data 502, time series analyzer 506 can also compute the current approximated frequency distribution $f_a(t_i)$. Based on the current actual increases D of the top-k items, in various embodiments, time series analyzer 506 can also compute the expected frequency distribution function for the next iteration $f_e(t_{i+1})$.

In some embodiments, traffic analysis process 248 may further include an anomaly detector 508 that is configured to detect anomalies among the dynamic metrics from the time series (e.g., frequencies, velocities, etc.). To detect an anomaly, anomaly detector 508 can compute the difference $f_a(t_i)-f_e(t_i)$, i.e., the actual frequencies minus the expected frequencies from the time series of sketches. In another embodiment, anomaly detector 508 can keep track of a top-k item and track how many times it has behaved anomalously. However, this would require anomaly detector 508 to go back into database 510 and search for this information, scanning through previous top-k item lists and marking an item along the way if it is anomalous. In further embodiments, anomalies can also be based on the changes in D, V, or A.

In one specific embodiment, anomaly detector 508 can detect anomalies by taking slices of X, the $3^{rd}$ order tensor, along the "t" (time) axis, to construct a matrix X[*,*,t] for each t. This matrix, which anomaly detector 508 can treat as a single sample, may include information about the rank of each item and the frequency at that rank. In turn, anomaly detector 508 can calculate a joint distribution about these two features among all items. For a new time slice, the distance between its corresponding matrix and the empirical distribution can be calculated, and if the distance exceeds a defined threshold, anomaly detector 508 may flag this as an anomaly and generate an anomaly detection alert. These alerts can then be sent to a user interface device for presentation to an administrator/user or to another system in the network, to effect corrective measures (e.g., rerouting traffic, allocating more resources, etc.).

To alert an administrator as to detected anomalies and provide information about the dynamics of the data in telemetry data 502, traffic analysis process 248 may include a user interface (UI) process 512 that generates UI data 514 for presentation by a user interface device, such as a display, speaker, or the like. For example, UI process 512 may send UI data 514 to a display, to render a graphical user interface (GUI) 516 for review by the administrator. Example data that UI data 514 may include, but are not limited to, any or all of the following about the top-k items from telemetry data 502:
 F: frequency
 D: difference in frequency
 V: velocity
 A: acceleration
 Anomalies: Items that significantly deviate from the expected frequency ($f_a$-$f_e$), as determined by anomaly detector 508. These items often change the ordering in the top-k ranking. In turn, these changes can be visualized on GUI 516, such as by using arrows between the ranking of the previous and current iteration.

In addition, UI data 514 may indicate any or all of the following regarding a given item/characteristic from telemetry data 502:
 Data source
 Data destination
 Data type
 Tags found in data, e.g., "Company-ACME.DC-West"
 Time interval, e.g., by minute/hour/day/week/month/etc.

Figure 6:
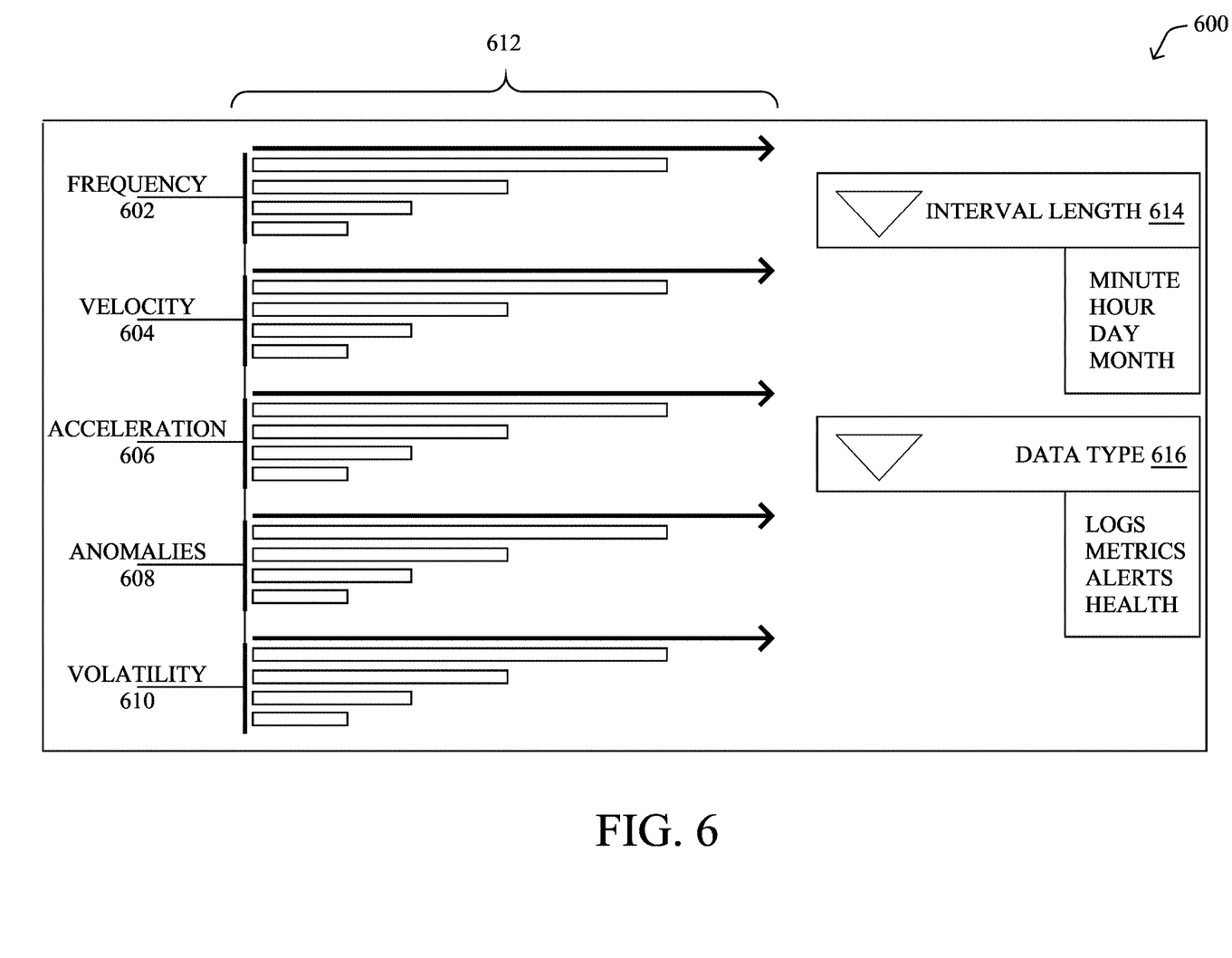
FIG. 6 illustrates an example graphical user interface (GUI)

FIG. 6 illustrates an example GUI 600, in some embodiments. Notably, GUI 600 may be generated by UI process 512 and sent for display by an electronic display. As shown, GUI 600 may provide a visualization of the items/characteristics from the telemetry data, such as the top k-number of items by frequency. For example, for each item/characteristic presented, GUI 600 may present metrics 612 regarding its frequency 602, velocity 604, acceleration 606, anomalies 608, and/or volatility 610. In addition, GUI 600 may include inputs 614-616 to adjust the displayed interval length (e.g., by minute, hour, day, month, etc.) and data type (e.g., logs, metrics, alerts, health status notices, etc.), respectively.

Figure 7:
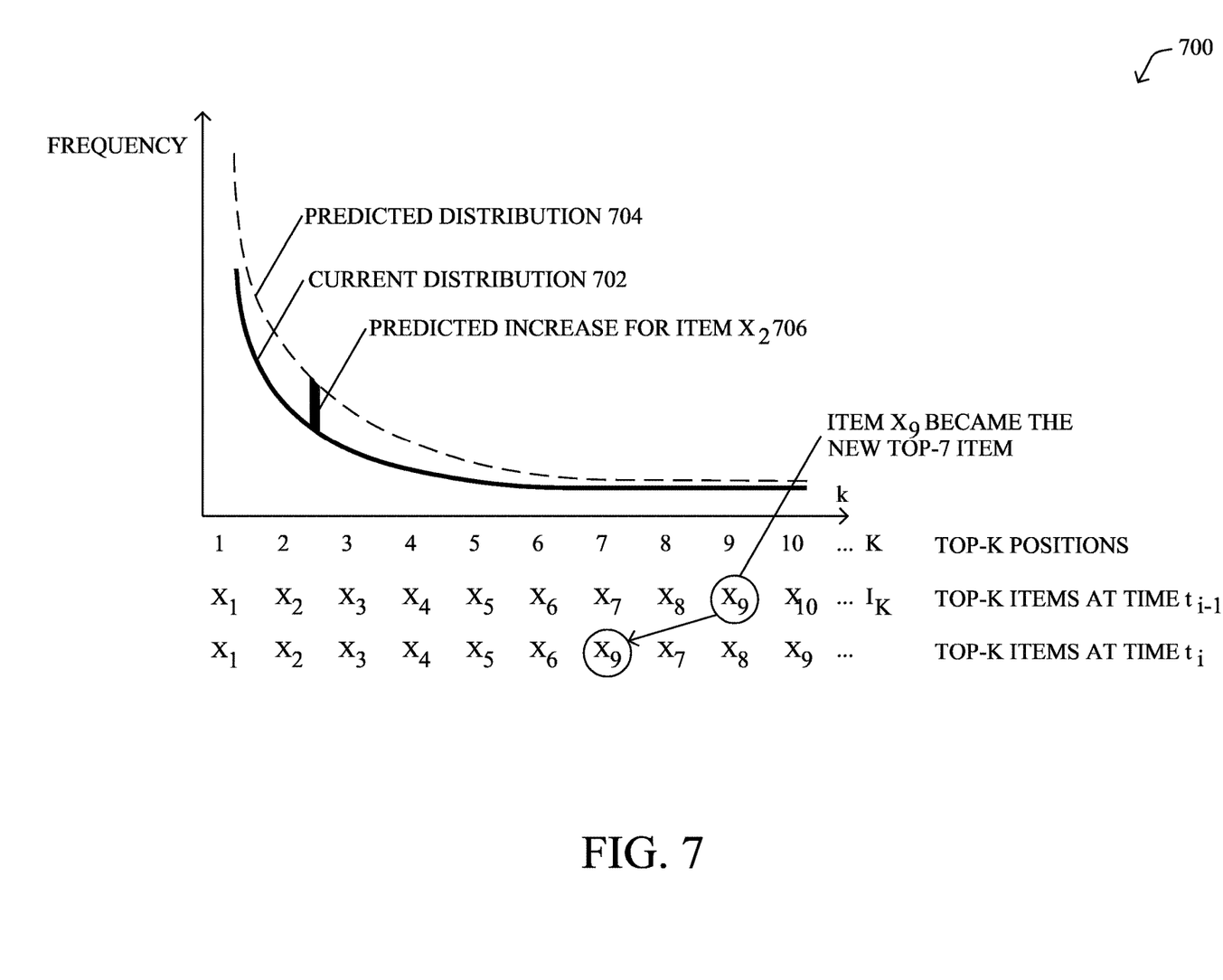
FIG. 7 illustrates an example of telemetry dynamics changing over time.

FIG. 7 illustrates an example of telemetry dynamics changing over time, in various embodiments. As shown, plot 700 plots the distribution of ranks (x-axis) vs. frequencies (y-axis) of the top k-number of characteristics/items from the stream of telemetry data. At a given time, $t_i$, the current frequency vs. rank position distribution may be distribution 702, shown. In addition, through analysis of the time series of sketches, the system may predict a corresponding distribution 704 for the next upcoming point in time, $t_{1+i}$. For example, the second highest ranked item, $x_2$, may be predicted to exhibit an increase 706 in its frequency in the next time interval. When current distribution 702 is updated with the sketch information for time the difference between this predicted frequency change for item $x_2$ and its actual change may be used to determine whether an anomaly exists (e.g., if the difference is above a threshold amount).

Unexpected rank changes can also signify an anomaly in the dynamics of the data. For example, as shown, assume that item $x_9$ that is the $9^{th}$ highest ranked item by frequency in current distribution 702 suddenly and unexpectedly jumps to the $7^{th}$ highest ranked item for time $t_{i+1}$. In such a case, the system may flag this as an anomaly and send an anomaly detection alert. Note that such an anomaly is based on the change of the item/characteristic in relation to the other items/characteristics in the telemetry data, allowing the system to capture these types of anomalies, as well. For example, assume that a particular alert is found within the telemetry data and that the alert tends to be the $9^{th}$ most frequently seen item in any given time period. If the rank of that item suddenly changes such that the alert is now the $2^{nd}$ most frequent item in a time period, this may indicate an anomalous condition, as the dynamics of the items in the stream of telemetry data has now changed.

Figure 8:
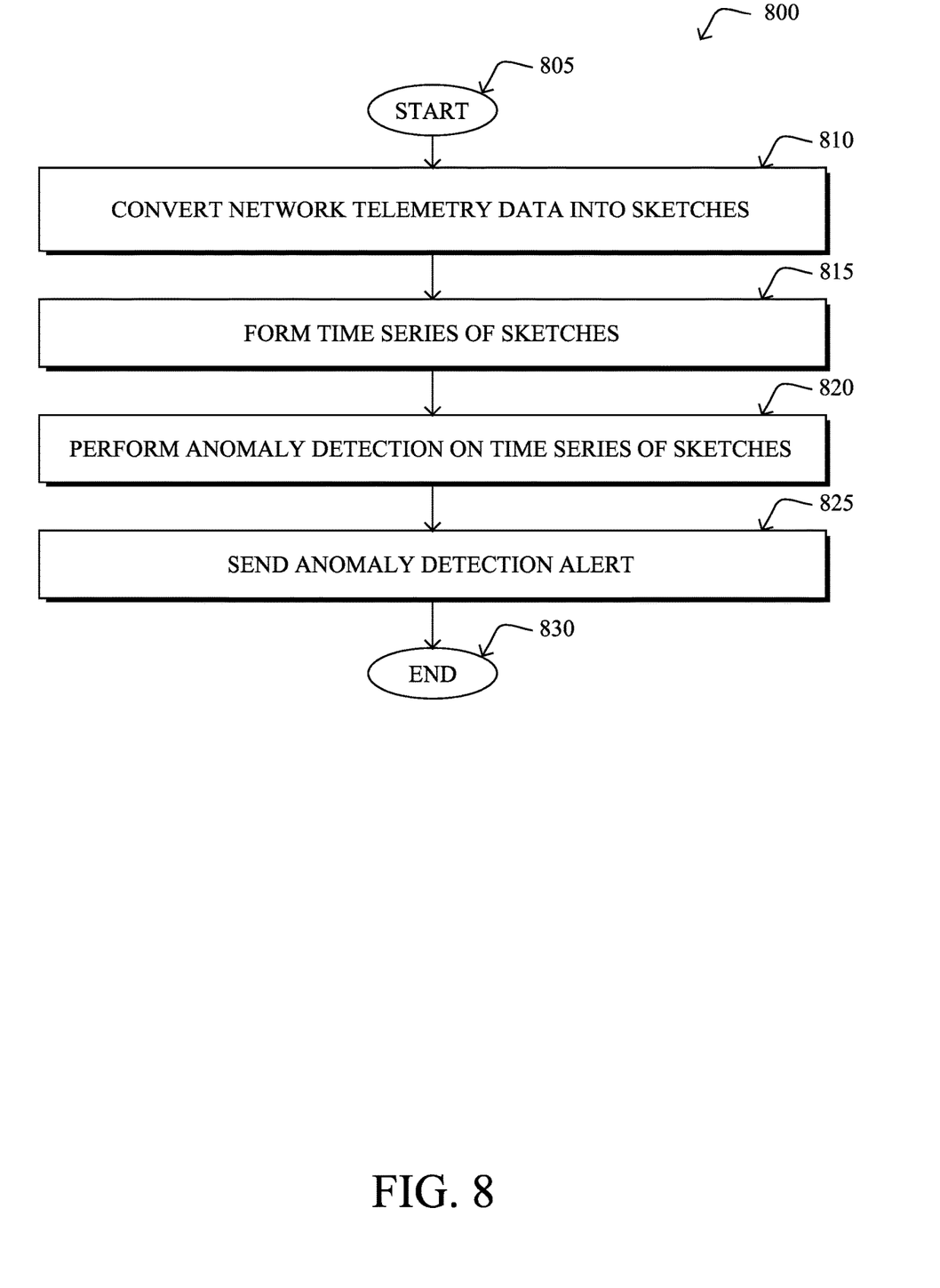
FIG. 8 illustrates an example simplified procedure for analyzing network telemetry data.

FIG. 8 illustrates an example simplified procedure for analyzing network telemetry data, in accordance with one or more embodiments described herein. For example, a non-generic, specifically configured device (e.g., device 200) may perform procedure 800 by executing stored instructions (e.g., process 248), to implement a service that analyzes captured telemetry data. The procedure 800 may start at step 805, and continues to step 810, where, as described in greater detail above, the service may convert a stream of network telemetry data into sketches. In some embodiments, the stream of network telemetry data comprises a plurality of characteristics of traffic observed in a network, such as measurements, calculations, alerts, notifications, or the like. For example, the service may convert the telemetry data into count-min sketches that tack the frequencies (e.g., number of occurrences) of the different items/characteristics in the stream of telemetry data.

In some embodiments, the service may convert the telemetry data into sketches by first determining, for a given time period, the frequency of each of the characteristics in the stream of telemetry during the time period as a count of occurrences of each of the characteristics. In turn, the service may determine ranks for each of the items/characteristics in the stream of telemetry data for the given time period by their determined frequencies. Then, the service may store the determined frequencies and ranks of a subset of the characteristics (e.g., the top k items by rank) in the stream of telemetry data for the given time period.

At step 815, as detailed above, the service may form a time series of the sketches. As noted, the service may compute sketches from the stream of telemetry data for different time periods (e.g., based on timestamps associated with the items in the stream), thus forming a time series of the different sketches. In turn, the service may store the sketches in a sketch database (e.g., to capture the frequencies, ranks, etc. of the different items/characteristics), along with their associated times. Thus, a time series of sketches for a span of time may be formed by the service using the stored sketches for that span of time.

At step 820, the service may perform anomaly detection on the time series of the sketches, as described in greater detail above. In some embodiments, the service may do so, in part, by calculating a joint distribution of ranks and frequencies of a portion of the characteristics at different points in time of the time series. Thus, changes in the ranks and/or frequencies that are not expected can indicate the presence of an anomaly. In further embodiments, the anomaly detection may entail calculating the velocities, accelerations, or volatilities of the items/characteristics.

At step 825, as detailed above, the service may send an anomaly detection alert, when an anomaly is detected from the time series of the sketches. For example, the service may send the alert to a GUI or other user interface, for review by a network administrator or other user. In other cases, the service may send the alert to another system configured to take corrective measures, automatically. Procedure 800 then ends at step 830.

It should be noted that while certain steps within procedure 800 may be optional as described above, the steps shown in FIG. 8 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, allow for the analysis of the dynamics of items/characteristics in a stream of telemetry data, such as the frequency, velocity, acceleration, and/or volatility of the items. In one aspect, the techniques herein can be used to build a time series database of snapshots of sketches, along with top-k lists. In another aspect, the techniques herein can be used to output a dashboard GUI to visualize any of these metrics, as well as to group metrics by dimension (e.g., time interval, data source, data destination, data type, tags, etc.). In a further aspect, the techniques herein can be used to detect anomalies based on the sketch snapshots in the time series database. In turn, anomaly detection alerts can be sent to the GUI dashboard, so as to visualize the dynamic metrics (e.g., velocity, acceleration, etc.), together with the detected anomalies.

While there have been shown and described illustrative embodiments that provide for a traffic analytics service for telemetry routers and monitoring systems, it is to be understood that various other adaptations and modifications may be made within the spirit and scope of the embodiments herein. For example, while certain embodiments are described herein with respect to using certain models for purposes of anomaly detection, the models are not limited as such and may be used for other functions, in other embodiments. In addition, while certain protocols are shown, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
converting, by a service, a stream of network telemetry data into sketches, wherein the stream of network telemetry data comprises a plurality of characteristics of traffic observed in a network;
forming, by the service, a time series of the sketches;
performing, by the service, anomaly detection on the time series of the sketches in part by:
calculating a current frequency for a subset of the characteristics, the current frequency defining a number of occurrences of each characteristic in the subset at a current time of the time series,
calculating a predicted frequency for the subset of the characteristics, the predicted frequency defining the number of occurrences of each characteristic in the subset at a future time,
calculating a predicted frequency change for a particular one of the characteristics in the subset according to a difference between the current frequency and the predicted frequency of the particular characteristic, and
determining whether an anomaly exists based on the predicted frequency change for the particular characteristic; and
sending, by the service, an anomaly detection alert, when the anomaly is determined to exist from the time series of the sketches,
wherein the subset of the characteristics includes a subset of the characteristics having the highest frequency at a particular time of the time series among the plurality of characteristics, and the particular characteristic is a characteristic in the subset of the characteristics having the highest frequency at the particular time of the time series.

2. The method as in claim 1, wherein converting the stream of network telemetry data into sketches comprises:
converting the stream of network telemetry data into count-min sketches.

3. The method as in claim 1, further comprising:
calculating, by the service, an acceleration for the particular characteristic as a change in the velocity for the particular characteristic over time; and
determining, by the service, whether a change in the acceleration for the particular characteristic is anomalous.

4. The method as in claim 1, wherein sending the anomaly detection alert comprises:
providing, by the service, data indicative of the anomaly to a user interface.

5. The method as in claim 1, wherein the particular characteristic comprises a log message, error code, or key-value pair.

6. The method as in claim 1, further comprising:
determining a rank for each of the characteristics in the subset for the current time based on the corresponding current frequency; and
storing, in a database maintained by the service, the current frequency and the rank for each of the characteristics in the subset for the current time.

7. An apparatus, comprising:
one or more network interfaces to communicate with a network;
a processor coupled to the one or more network interfaces and configured to execute a process; and
a memory configured to store the process executable by the processor, the process when executed configured to:
convert a stream of network telemetry data into sketches, wherein the stream of network telemetry data comprises a plurality of characteristics of traffic observed in a network;
form a time series of the sketches;
perform anomaly detection on the time series of the sketches in part by:
calculating a current frequency for a subset of the characteristics, the current frequency defining a number of occurrences of each characteristic in the subset at a current time of the time series,
calculating a predicted frequency for the subset of the characteristics, the predicted frequency defining the number of occurrences of each characteristic in the subset at a future time,
calculating a predicted frequency change for a particular one of the characteristics in the subset according to a difference between the current frequency and the predicted frequency of the particular characteristic, and
determining whether an anomaly exists based on the predicted frequency change for the particular characteristic; and
send an anomaly detection alert, when the anomaly is determined to exist from the time series of the sketches,
wherein the subset of the characteristics includes a subset of the characteristics having the highest frequency at a particular time of the time series among the plurality of characteristics, and the particular characteristic is a characteristic in the subset of the characteristics having the highest frequency at the particular time of the time series.

8. The apparatus as in claim 7, wherein the apparatus converts the stream of network telemetry data into sketches by:
converting the stream of network telemetry data into count-min sketches.

9. The method as in claim 7, wherein the process when executed is further configured to:
calculate an acceleration for the particular characteristic as a change in the velocity for the particular characteristic over time; and
determine whether a change in the acceleration for the particular characteristic is anomalous.

10. The apparatus as in claim 7, wherein the apparatus sends the anomaly detection alert by:
providing data indicative of the anomaly to a user interface.

11. The apparatus as in claim 7, wherein the particular characteristic comprises a log message, error code, or key-value pair.

12. The apparatus as in claim 7, wherein the process when executed is further configured to:
determine a rank for each of the characteristics in the subset for the current time based on the corresponding current frequency; and
store, in a database maintained by the service, the current frequency and the rank for each of the characteristics in the subset for the current time.

13. A tangible, non-transitory, computer-readable medium storing program instructions that cause a service in a network to execute a process comprising:
converting, by the service, a stream of network telemetry data into sketches, wherein the stream of network telemetry data comprises a plurality of characteristics of traffic observed in a network;

forming, by the service, a time series of the sketches;
performing, by the service, anomaly detection on the time series of the sketches in part by:
   calculating a current frequency for a subset of the characteristics, the current frequency defining a number of occurrences of each characteristic in the subset at a current time of the time series,
   calculating a predicted frequency for the subset of the characteristics, the predicted frequency defining the number of occurrences of each characteristic in the subset at a future time,
   calculating a predicted frequency change for a particular one of the characteristics in the subset according to a difference between the current frequency and the predicted frequency of the particular characteristic, and
   determining whether an anomaly exists based on the predicted frequency change for the particular characteristic; and
sending, by the service, an anomaly detection alert, when the anomaly is determined to exist from the time series of the sketches,
wherein the subset of the characteristics includes a subset of the characteristics having the highest frequency at a particular time of the time series among the plurality of characteristics, and the particular characteristic is a characteristic in the subset of the characteristics having the highest frequency at the particular time of the time series.

14. The computer-readable medium as in claim 13, wherein the process further comprises:
   calculating an acceleration for the particular characteristic as a change in the velocity for the particular characteristic over time; and
   determining whether a change in the acceleration for the particular characteristic is anomalous.

15. The computer-readable medium as in claim 13, wherein the process further comprises:
   determining a rank for each of the characteristics in the subset for the current time based on the corresponding current frequency; and
   storing, in a database maintained by the service, the current frequency and the rank for each of the characteristics in the subset for the current time.

16. The computer-readable medium as in claim 13, wherein converting the stream of telemetry data into sketches further comprises:
   converting the stream of network telemetry data into count-min sketches.

17. A method comprising:
   converting, by a service, a stream of network telemetry data into sketches, wherein the stream of network telemetry data comprises a plurality of characteristics of traffic observed in a network;
forming, by the service, a time series of the sketches;
performing, by the service, anomaly detection on the time series of the sketches in part by:
   calculating a current frequency for a subset of the characteristics, the current frequency defining a number of occurrences of each characteristic in the subset at a current time of the time series,
   calculating a predicted frequency for the subset of the characteristics, the predicted frequency defining the number of occurrences of each characteristic in the subset at a future time,
   calculating a predicted frequency change for a particular one of the characteristics in the subset according to a difference between the current frequency and the predicted frequency of the particular characteristic, and
   determining whether an anomaly exists based on the predicted frequency change for the particular characteristic; and
sending, by the service, an anomaly detection alert, when the anomaly is determined to exist from the time series of the sketches,
wherein the method further comprises:
   determining a rank for each of the characteristics in the subset for the current time based on the corresponding current frequency; and
   storing, in a database maintained by the service, the current frequency and the rank for each of the characteristics in the subset for the current time.

* * * * *